June 5, 1962   L. W. McCONNELL   3,037,650
CARGO MOVER
Filed June 2, 1961   2 Sheets-Sheet 2
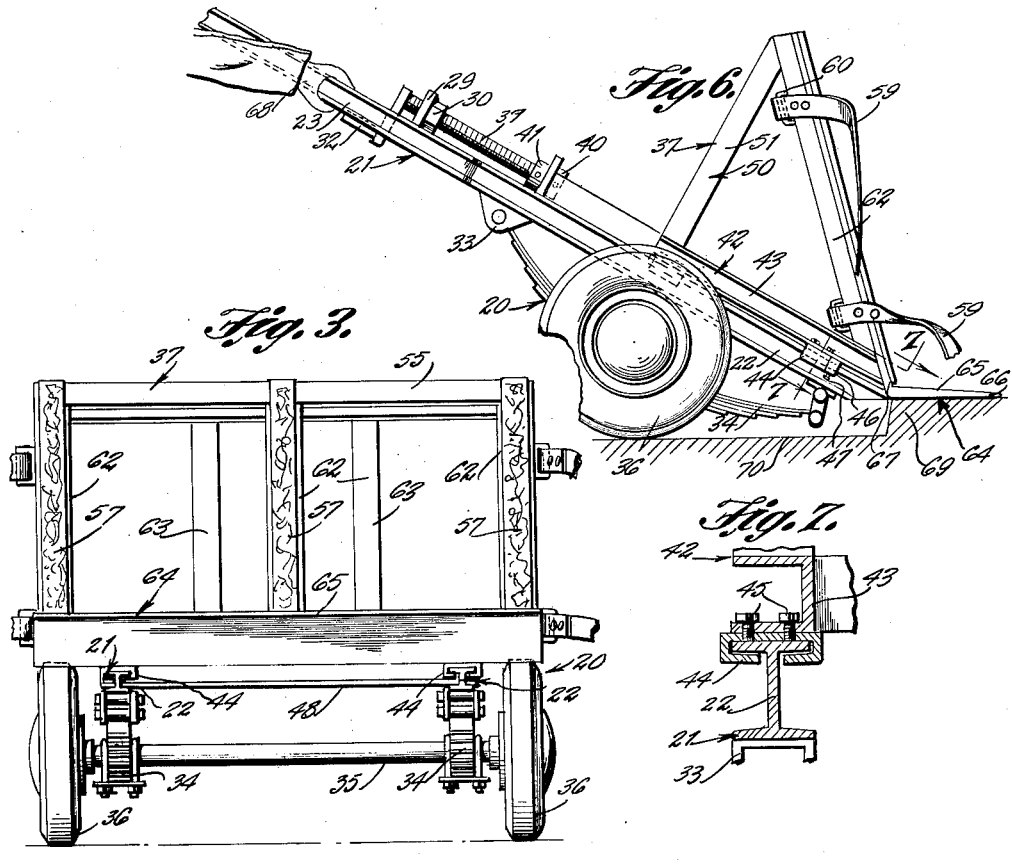
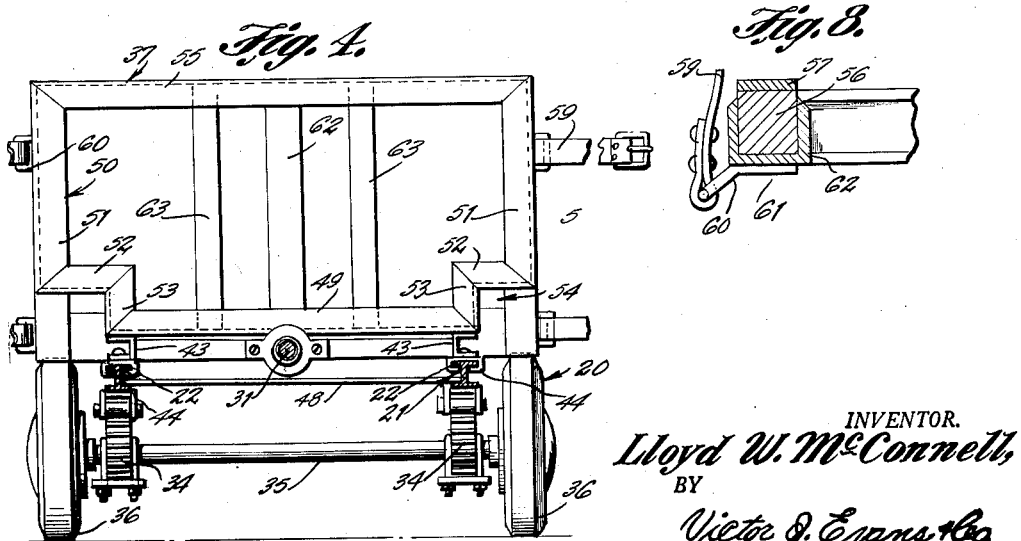
INVENTOR.
Lloyd W. McConnell,
BY
Victor J. Evans + Co
Attorneys United States Patent Office 3,037,650
Patented June 5, 1962

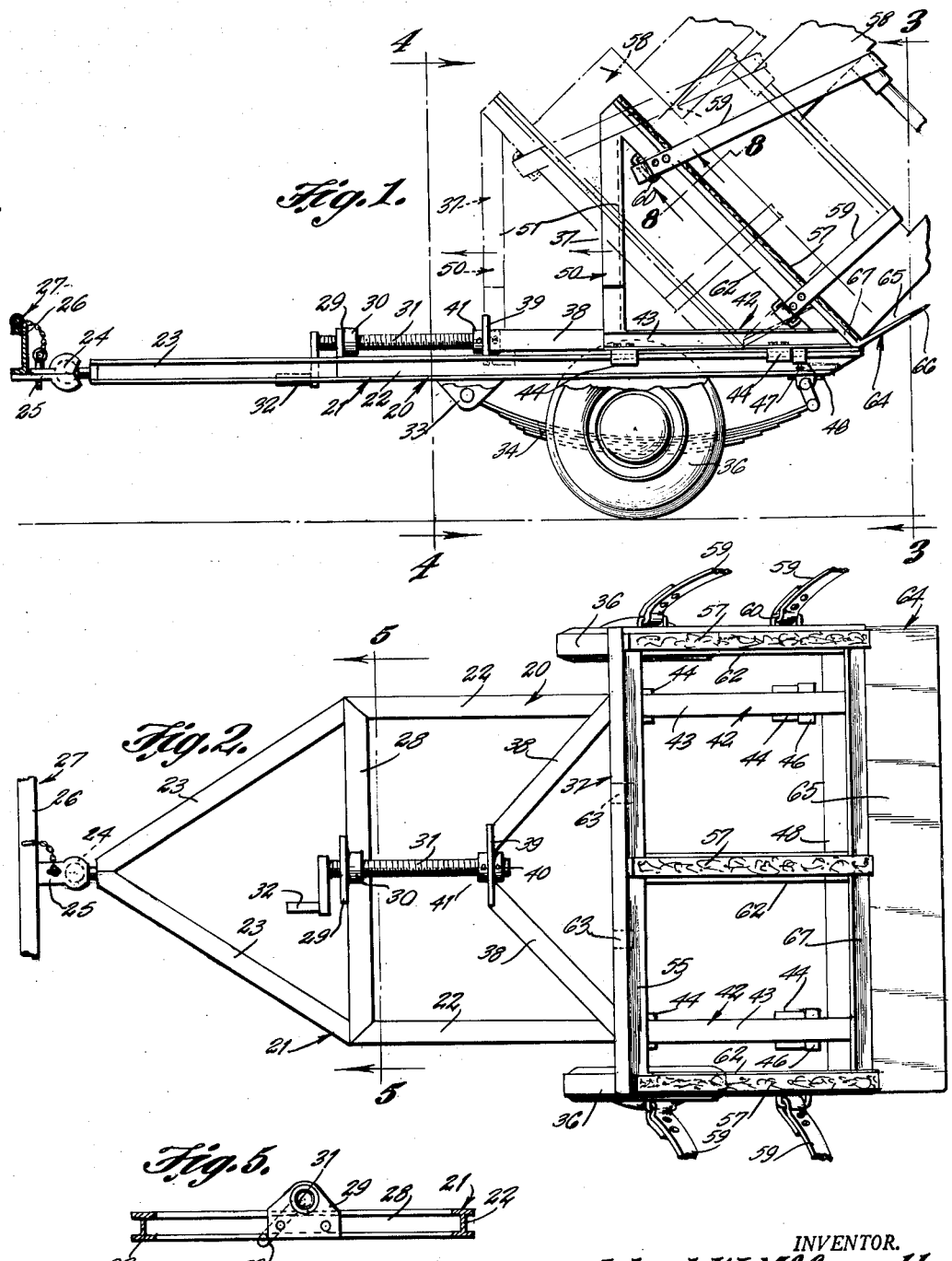

3,037,650
CARGO MOVER
Lloyd W. McConnell, 333 S. Tinn St., Deming, N. Mex.
Filed June 2, 1961, Ser. No. 114,370
2 Claims. (Cl. 214—506)

This invention relates to a vehicle or trailer for use in moving heavy loads, cargo or the like.

The primary object of the present invention is to provide a cargo mover which is adapted to be pulled or towed behind a vehicle such as a truck, automobile or the like, and wherein the cargo mover of the present invention includes a main frame that is supported above an axle that has wheels thereon, and wherein there is provided a support unit which is adjustably connected to the main frame, and wherein the support unit can be adjusted relative to the main frame so that with a cargo or load connected to the support unit, the center of gravity can be shifted in order to properly balance the load in order to facilitate the transporting or moving of the load from one place to another.

Another object is to provide a cargo mover which is especially suitable for use in handling heavy loads such as pianos, organs, heavy appliances or the like, and wherein with the present invention one person can conveniently or easily load or unload the device of the present invention, and wherein the load is adapted to be handled and conveyed in such a manner so that the load or cargo will not be damaged or harmed.

Another object is to provide a cargo mover or handler which can be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a side elevational view showing the cargo mover of the present invention hooked to the rear bumper of a vehicle and illustrating by dotted lines the load moved to a balanced position on the main frame.

FIGURE 2 is a top plan view with the load removed.

FIGURE 3 is a sectional view taken on the line 3—3 of FIGURE 1.

FIGURE 4 is a sectional view taken on the line 4—4 of FIGURE 1.

FIGURE 5 is a sectional view taken on the line 5—5 of FIGURE 2.

FIGURE 6 is a side elevational view illustrating the cargo mover of the present invention and showing the device placed in a position by hand at a curb to receive a load, and with parts broken away and in section.

FIGURE 7 is a sectional view taken on the line 7—7 of FIGURE 6, and being on an enlarged scale.

FIGURE 8 is a sectional view taken on the line 8—8 of FIGURE 1, taken on an enlarged scale.

Referring in detail to the drawings, the numeral 20 indicates the cargo mover of the present invention which is shown to comprise a main frame that is indicated generally by the numeral 21, and the main frame 21 includes a pair of spaced parallel side portions 22 that are adapted to be made of a suitable material such as I beams, and the main frame 21 further includes a pair of angularly arranged front sections 23 which have a hitch 24 on the front end thereof for attachment to a coupling 25 that may be suitably affixed to a bumper such as the rear bumper 26 of a towing vehicle 27. The vehicle 27 may be a truck, automobile or the like. As shown in FIGURE 2, a brace 28 extends between the side portions 22 and is secured thereto or formed integral therewith, and the numeral 29 indicates a plate which is secured as by welding to the brace 28. A rotary screw member 31 is adjustably extended through the plate 29, and a nut 30 is engaged by the screw member 31, there being a hand crank 32 on the front end of the screw member 31.

As shown in the drawings brackets 33 depend from the side portions 22 of the main frame 21, and spring members 34 are suitably connected to the brackets 33, there being a horizontally disposed axle 35 which is operatively connected to the spring members 34, and a pair of ground engaging wheels 36 are suitably connected to the ends of the axle 35.

The cargo mover 20 of the present invention further includes a support unit which is indicated generally by the numeral 37, and the support unit 37 is adjustably connected to the main frame 21. Secured to the lower front portion of the support unit 37 is a pair of angularly arranged arms 38, and a plate 39 is suitably affixed to the front ends of the arms 38, there being collars or bushings 40 and 41 contiguous to the plate 39, and the elements such as the elements 39, 40 and 41 are connected to the rear end of the screw member 31. Thus, by rotating the screw member 31 by means of the hand crank 32 the support unit 37 can be moved back and forth or adjusted on the main frame 21 as later described in this application.

The support unit 37 includes a lower base section which is indicated generally by the numeral 42, and the base section 42 embodies a pair of spaced parallel side pieces 43 which have slides 44 depending therefrom, and the slides 44 may be secured to the side pieces 43 in any suitable manner, as for example by means of bolts or screws 45, FIGURE 7. The slides 44 adjustably or slidably engage the side portions 22 of the main frame 21. The numeral 46 indicates stop members that are suitably affixed to the side portions 22 as for example by means of securing elements 47 so that the stop members 46 serve to limit movement of the support unit 37 on the main frame 21.

The numeral 48 indicates a brace which extends between the rear ends of the side portions 22 and which are secured thereto in any suitable manner.

As shown in FIGURE 4, a front end piece 49 is provided at the front portion of the base section 42, and the support unit 37 further includes uprights 50 which include straight sections 51 as well as horizontal sections 52 and vertical sections 53 whereby there is provided offset spaces 54 that provide clearance for wheels 36 as the support unit 37 is adjusted back and forth on the main frame.

The support unit 37 further includes a horizontally disposed cross piece 55 which extends between the upper ends of the uprights 50 and which is secured thereto or formed integral therewith, and inclined beams 62 extend between the crosspiece 55 and the rear portion of the base section 42 and are affixed thereto, and as shown in FIGURE 8, wooden elements 56 are adapted to be suitably secured within the beams 62, and cushioning strips 57 which may be made of a suitable material such as felt are adapted to be adhesively secured to the wood elements 56 so that when a cargo 58 which may be a piano or the like is being transported or handled, such cargo will not be damaged or harmed. The cargo 58 is adapted to be retained in place by means of straps 59 which can be suitably fastened around the cargo 58, and the straps 59 are adapted to be connected to the outermost beams 62 as for example by means of the brackets 60 which can be secured to the beams by rivets or other securing elements 61.

The numeral 63 indicates bars or braces which help strengthen the support unit 37.

Secured to the rear portion of the support unit 37 is a lip or tongue which is indicated generally by the numeral 64, and the lip 64 includes a main body portion 65 which has a rearwardly arranged tapered edge 66, and the lip 64 further includes a portion 67 that is arranged angularly with respect to the main body portion 65 so that the portion 67 defines a shoulder for a purpose to be later described.

From the foregoing, it is apparent that there has been provided a device which is especially suitable for use in handling and moving cargo, heavy loads or the like, and for example the device 20 is especially suitable for use in transporting a member such as a piano as indicated by the numeral 58. In use with the parts arranged as shown in the drawings, the member 20 is adapted to be arranged in a position such as that shown in FIGURE 6 and in FIGURE 6 the numeral 68 indicates a portion of a person's hands which are shown manually engaging the main frame 21 so as to tilt the main frame in order to permit the main body portion 65 of the tongue 64 to conveniently rest on a curb such as the curb 69, while the wheels 36 may be arranged adjacent to the curb and in the street as indicated by the numeral 70. With the device in the position of FIGURE 6, the piano can then be rolled from a store or other locality onto the tongue 64, and then the frame 21 can be manually pivoted in a counter-clockwise direction, FIGURE 6, whereby the coupling 24 on the front end of the frame 21 can be connected to a coupling such as the coupling 25 on the rear bumper 26 of a towing vehicle 27. Before hauling the piano away, the hand crank 32 is adapted to be manually rotated in order to turn the screw member 31 and this will cause the support unit 37 to be adjusted to the proper position so that with the piano 58 connected to the support unit 37 as for example by means of the straps 59, the piano 58 can be balanced so that the center of gravity of the piano is in alignment with the wheels 36 whereby the piano can be transported or conveyed on the device 20 with the piano properly centered. After the destination is reached, a reverse procedure can be followed so that the straps 59 can be released from the piano 58 whereby the piano can be removed from the device as for example after the device is uncoupled from the towing vehicle, the support unit 37 can be moved rearwardly by properly manually moving the crank 32 so as to rotate the screw member 31 and then the device can be tilted to a position such as that shown in FIGURE 6 in order to facilitate unloading of the piano or other cargo.

The piano is adapted to rest on the pads or strips 57 which may be made of a suitable cushion like material such as felt, and these pads or strips 57 are suitably secured as for example by means of an adhesive to the wooden blocks 56 which are secured within the beams 62 so that the provision of the strips 57 and wooden blocks 56 provides an arrangement whereby a member such as an expensive piano or the like can be safely transported or conveyed without scratching or marring or otherwise damaging such an instrument or other cargo.

As the support unit 37 shifts back and forth in order to center or position the load or cargo at the desired location, the sliding connection between the members 44 and the side portions 22 is such so as to insure that the desired adjustable movement can be accomplished, and the slides 44 permit the support unit 37 to move back and forth on the main frame 21, but these slides 44 prevent the support unit 37 from becoming entirely accidentally separated from the main frame. Stop members such as the stop members 46 may be secured to the side portions 22 so as to limit adjustable or sliding movement of the support unit 37.

The screw member 31 is connected as at 40 and 41 and 39 to the arms 38, and the rear ends of the arms 38 are suitably secured as by welding to the lower portion of the support unit 37, so that as the screw member 31 is rotated by means of the handle or hand crank 32, the support unit 37 will move back and forth on the main frame 21.

The straps 59 are adapted to be provided with suitable buckles or clasps, so that such straps can be securely maintained connected to the piano, and wherein the straps can be loosened or tightened as desired or required whereby loads of different sizes or configurations can be readily transported and held in place.

The parts can be made of any suitable material and in different shapes or sizes.

The present invention can be used for moving pianos, heavy appliances or the like, and wherein heavy cargo can be readily loaded or unloaded so that such cargo can be conveniently trucked from one location to another. An important aspect or feature of the present invention is the method by which the cargo is loaded and unloaded since the heavy cargo can be loaded and unloaded with a minimum of effort, and one person can readily load, transport and unload a heavy cargo with no additional help.

The present invention includes the support unit or frame 37 that includes the beams 62 against which the piano 58 is adapted to rest, and with the parts arranged as shown in FIGURE 1, the inclined beams 62 are arranged at an angle of forty-five degrees with respect to the vertical or horizontal. The I beams 22 function as the runners for the trailer, and the springs 34 are mounted below the beams or members 22, and the axle 35 and wheels 36 are suitably connected to the springs 34 as on a two wheel trailer so as to provide a two wheel device which can be pulled behind a vehicle. The cargo 58 is trucked on a forty-five degree angle as shown in FIGURE 1, and the cargo is secured to the loading surfaces 57 by means of belts or straps 59. The lip or tongue 64 is arranged to the back of the forty-five degree support unit or frame 37 so that the portion 66 of the lip 64 can slide under the cargo to support it. Notches may be cutout to provide clearance for the rollers on a piano, and such notches will permit the lip or plate 64 to slide under the piano.

The following is given as a detailed explanation of the loading procedure. First the device is unhooked from the vehicle as at 24 and 25, and then the device can be manipulated by hand, and the numeral 68 in FIGURE 6 indicates a person's hand manipulating the device to the desired location so that for example the device 20 can be backed up by hand until it is contiguous to a curb or sidewalk such as the sidewalk or curb 69. The device is adapted to be positioned so that the frame 21 is at an angle of approximately forty-five degrees with respect to the horizontal as shown in FIGURE 6, and then the hand crank 32 can be manually rotated in order to cause the screw member 31 to move the support unit 37 to a rearward or lowered position adjacent the ground or curb as shown in FIGURE 6, and with the parts in the position of FIGURE 6, the beams 62 are at an angle of approximately ninety degrees with respect to the horizontal so that this will fit approximately flush with the loading surface of the cargo, and the portion 65 of the plate 64 will be flat on the surface 69 so that the portion 65 can be slid under the cargo to be loaded. Next, the cargo is secured to the loading surface 57 of the forty-five degree frame or support unit 37 by means of the web belts 59, and the screw member 31 is then operated by means of the hand crank 32 to pull the forty-five degree frame 37 forward on the I beams 22 and the support unit 37 will slide on the members 22. When the support unit 37 is moved forward on the main frame 21, the cargo and trailer will reach a balancing point and may then be manipulated very easily by hand so that it can be hitched to the vehicle such as the vehicle 27 with a minimum amount of effort. It is to be understood that the slide or main frame can be made in different ways, and for example a track with rollers can be utilized, or a track on rollers, or a V-way, can be used, as desired or required.

The use of the forty-five degree construction or angle of the beams 62 relative to the upright 50 is an important aspect of the loading frame or support unit 37. In addition, the ability to slide the unit 37 backward and forward on the main frame in order to equalize the load so that all pieces of cargo can be loaded and transported regardless of the weight or size thereof, is advantageous.

A further advantageous feature is that with the tongue or front portion of the frame 21 in raised position as shown in FIGURE 6, and the back of the trailer touching the ground or curb as shown in FIGURE 6, the main frame 21 will be at an angle forty-five degrees with respect to the horizontal, and this will put the loading frame or support unit 37 in such a position that the beams 62 will be at approximately ninety degrees with respect to the horizontal, and a spacer is adapted to be used between the axle and the springs to either lower or raise the frame from the ground to the bottom of the I beams.

The screw member 31 and its actuating crank 32 are adapted to be connected to a brace 28 on the main frame 21, and instead of using the screw member 31, a cable and winch mechanism can be used for causing movement of the loading frame or support unit 37.

As shown in FIGURE 8 the loading surface of the forty-five degree frame 37 is adapted to be made of channel members or channel irons 62, and the boards 56 can be secured in the channel irons 62 in any suitable manner as for example by means of rivets, bolts or the like, and the fabric padding or striping 57 which is made of a suitable material such as wool is adapted to be arranged over the wooden boards 56 in order to protect the cargo from damage.

The present invention can be used for various types of moving jobs as for example it is especially suitable for moving pianos, organs, or appliances, and the device is constructed so that one person can handle or move cargo without requiring outside assistance, and basically the present invention provides a means whereby one person can load and unload a cargo of a particular shape or size, with ease, and once the cargo is loaded on the rack or trailer, the support unit 37 can be moved to a position of balance relative to the wheels. The cargo is adapted to be moved or slid to a position of balance as for example it can be moved within five percent of the center of gravity of the axle of the device. The slide ways can be made of any suitable material and for example may be cylindrical in formation or else they may be flat ways as desired or required.

One of the important features or aspects of the present invention is the fact that a piano, appliance or the like can be transported very safely so that for example damage to the cargo will be prevented.

Although the invention herein described is fully capable of achieving the objects and providing the advantages hereinbefore mentioned, it is to be understood that it is merely illustrative of the presently preferred embodiment of the invention and that it is not to be limited to the details of construction herein described other than as defined in the appended claims.

What is claimed is:

1. A cargo mover and handler comprising a main frame including a pair of spaced parallel side portions, said main frame further including a pair of angularly arranged front portions having a coupling on the front thereof adapted to be connected to a towing vehicle, a brace extending between said side portions and affixed thereto, a plate extending upwardly from said brace and connected thereto, a screw member operatively connected to said plate and having a hand crank on the front end thereof, brackets depending from said side portions, spring members operatively connected to said brackets, an axle operatively connected to said spring members, a pair of wheels connected to said axle; a support unit adjustably connected to said main frame, angularly arranged arms connected to the lower front portion of said support unit, means operatively connecting the front ends of said arms to said screw member, said support unit including a base section embodying a pair of spaced parallel side pieces having slides depending therefrom and said slides being adjustably connected to the side portions of said main frame, uprights having straight sections arranged at right angles with respect to said base section, a horizontally disposed cross piece extending between the upper ends of said uprights and affixed thereto, inclined beams extending between said crosspiece and the rear portion of said base section and affixed thereto, a tongue affixed to the rear portion of said support unit, said tongue including a rearwardly arranged main body portion having a tapered thin rear edge, and said tongue further including a shoulder portion arranged angularly with respect to the main body portion of the tongue.

2. A cargo mover and handler comprising a main frame including a pair of spaced parallel side portions, said main frame further including a pair of angularly arranged front portions having a coupling on the front thereof adapted to be connected to a towing vehicle, a brace extending between said side portions and affixed thereto, a plate extending upwardly from said brace and connected thereto, a screw member operatively connected to said plate and having a hand crank on the front end thereof, brackets depending from said side portions, spring members operatively connected to said brackets, an axle operatively connected to said spring members, a pair of wheels connected to said axle; a support unit adjustably connected to said main frame, angularly arranged arms connected to the lower front portion of said support unit, means operatively connecting the front ends of said arms to said screw member, said support unit including a base section embodying a pair of spaced parallel side pieces having slides depending therefrom and said slides being adjustably connected to the side portions of said main frame, uprights having straight sections arranged at right angles with respect to said base section, a horizontally disposed cross piece extending between the upper ends of said uprights and affixed thereto, inclined beams extending between said crosspiece and the rear portion of said base section and affixed thereto, a tongue affixed to the rear portion of said support unit, said tongue including a rearwardly arranged main body portion having a tapered thin rear edge, and said tongue further including a shoulder portion arranged angularly with respect to the main body portion of the tongue, said beams being arranged at an angle of forty-five degrees with respect to the straight sections of said uprights, straps connected to certain of said beams for engagement with a cargo, supporting blocks mounted securely within said beams, and protective cushioning strips affixed to said last named blocks.

References Cited in the file of this patent

UNITED STATES PATENTS

| | | |
|---|---|---|
| 1,379,472 | Morgan et al. | May 24, 1921 |
| 2,092,663 | Bach | Sept. 7, 1937 |
| 2,440,681 | Gordon | May 4, 1948 |